US012504705B2

(12) United States Patent
Yoshiura et al.

(10) Patent No.: US 12,504,705 B2
(45) Date of Patent: Dec. 23, 2025

(54) FIXING DEVICE AND IMAGE FORMING APPARATUS INCORPORATING THE SAME INCLUDING A SLIDE SHEET WITH ADHESIVE TO BOND THE SLIDE SHEET

(71) Applicants: Arinobu Yoshiura, Kanagawa (JP); Takamasa Hase, Kanagawa (JP); Daisuke Inoue, Tokyo (JP); Kentaro Yamashita, Kanagawa (JP); Shogo Nakamoto, Kanagawa (JP); Mototaka Iwama, Kanagawa (JP)

(72) Inventors: Arinobu Yoshiura, Kanagawa (JP); Takamasa Hase, Kanagawa (JP); Daisuke Inoue, Tokyo (JP); Kentaro Yamashita, Kanagawa (JP); Shogo Nakamoto, Kanagawa (JP); Mototaka Iwama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 50 days.

(21) Appl. No.: 18/592,544

(22) Filed: Mar. 1, 2024

(65) Prior Publication Data

US 2024/0310759 A1 Sep. 19, 2024

(30) Foreign Application Priority Data

Mar. 13, 2023 (JP) ................................ 2023-038702

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
CPC ........... G03G 15/2025; G03G 15/2017; G03G 15/2053; G03G 15/2064; G03G 21/1647
See application file for complete search history.

(56) References Cited

U.S. PATENT DOCUMENTS 8,929,791 B2 * 1/2015 Ishii ..................... G03G 15/206 399/329
2021/0041812 A1 2/2021 Mimbu et al.

FOREIGN PATENT DOCUMENTS

JP 2018005047 A * 1/2018 ......... G03G 15/2025
JP 2019-168626 A 10/2019
JP 2020-013015 A 1/2020

* cited by examiner

*Primary Examiner* — Arlene Heredia Ocasio
(74) *Attorney, Agent, or Firm* — XSENSUS LLP

(57) ABSTRACT

A fixing device includes a fixing rotator rotatable in a rotation direction, a heat source to heat the fixing rotator, a pressure rotator contacting the fixing rotator, a nip formation pad to form a fixing nip between the fixing rotator and the pressure rotator, a slide sheet, and an adhesive part. The slide sheet between the fixing rotator and the nip formation pad contacts an inner circumferential face of the fixing rotator. The slide sheet has a center part and both end parts in an axial direction orthogonal to the rotation direction. The adhesive part bonds the slide sheet to the nip formation pad. The adhesive part includes a first adhesive part on the center part and a second adhesive part on one of the end parts. The first adhesive part has a first area, and the second adhesive part has a second area smaller than the first area.

20 Claims, 8 Drawing Sheets

FIXING DEVICE AND IMAGE FORMING APPARATUS INCORPORATING THE SAME INCLUDING A SLIDE SHEET WITH ADHESIVE TO BOND THE SLIDE SHEET

CROSS-REFERENCE TO RELATED APPLICATION

This patent application is based on and claims priority pursuant to 35 U.S.C. § 119(a) to Japanese Patent Application No. 2023-038702, filed on Mar. 13, 2023, in the Japan Patent Office, the entire disclosure of which is hereby incorporated by reference herein.

BACKGROUND

Technical Field

Embodiments of the present disclosure relate to a fixing device and an image forming apparatus incorporating the fixing device.

Related Art

In general, image forming apparatuses such as a copier, a printer, and a facsimile machine include fixing devices. The fixing device known in the art includes a fixing rotator having an endless tube shape, such as a fixing belt and a pressure rotator. In such a fixing device, the fixing rotator and the pressure rotator form a nip. Applying heat and pressure to toner in the nip fixes the toner onto a recording sheet.

The fixing device includes a nip formation pad disposed inside the loop of the fixing belt and lubricant applied to an inner face of the fixing belt to facilitate sliding of the fixing belt on the nip formation pad.

SUMMARY

This specification describes an improved fixing device that includes a fixing rotator, a heat source, a pressure rotator, a nip formation pad, a slide sheet, and an adhesive part. The fixing rotator is rotatable in a rotation direction. The heat source heats the fixing rotator. The pressure rotator contacts an outer circumferential face of the fixing rotator. The nip formation pad forms a fixing nip between the fixing rotator and the pressure rotator. The slide sheet is between the fixing rotator and the nip formation pad to contact an inner circumferential face of the fixing rotator. The slide sheet has a center part and both end parts in an axial direction orthogonal to the rotation direction of the fixing rotator. The adhesive part bonds the slide sheet to the nip formation pad. The adhesive part includes a first adhesive part on the center part and a second adhesive part on one of the end parts. The first adhesive part has a first area, and the second adhesive part has a second area smaller than the first area of the first adhesive part.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
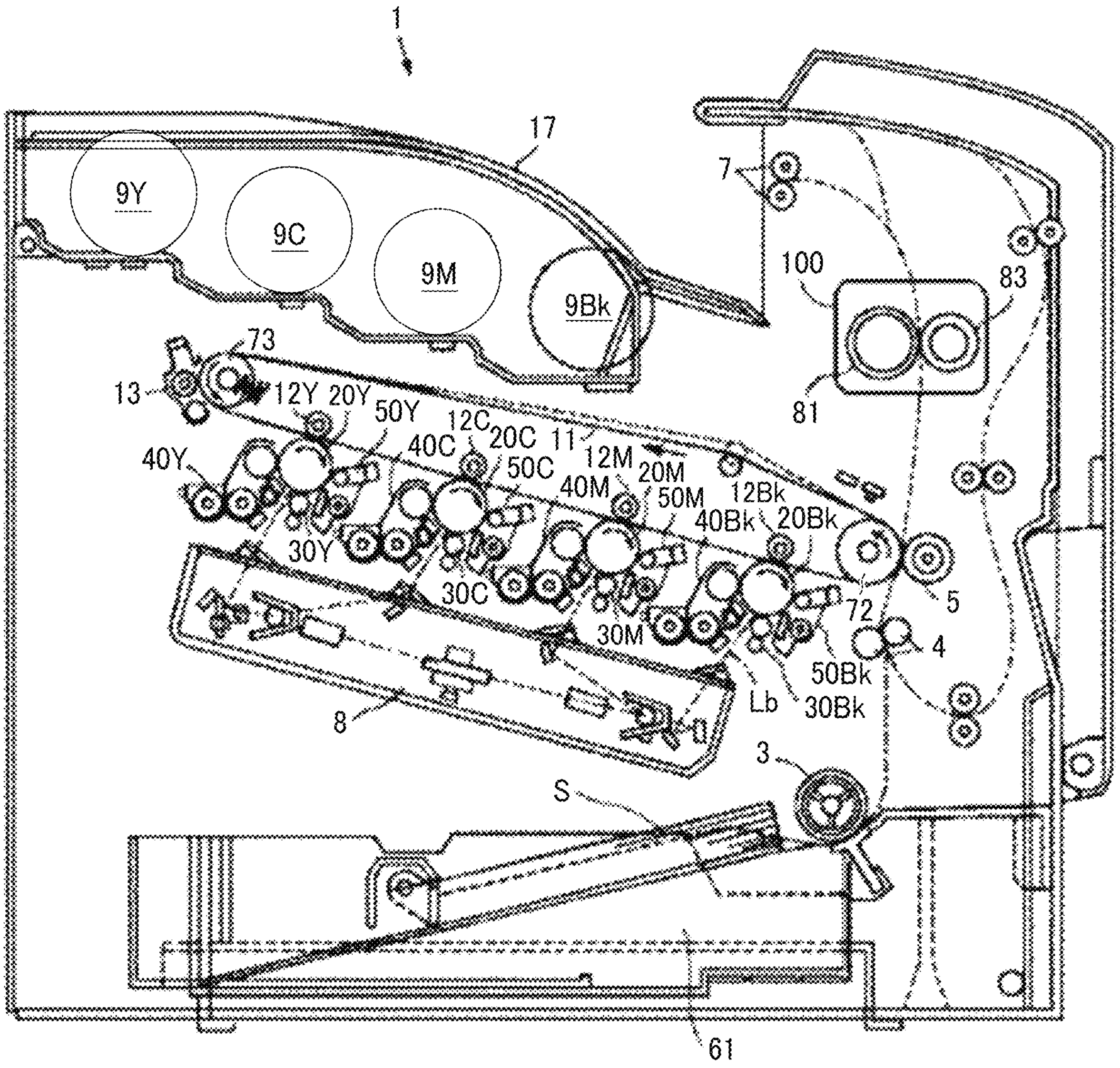
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms “a,” “an,” and “the” are intended to include the plural forms as well, unless the context clearly indicates otherwise.

Embodiments of the present disclosure are described below in detail with reference to the drawings. Identical reference numerals are assigned to identical or equivalent components and a description of those components may be simplified or omitted.

The following describes a configuration of an image forming apparatus.

FIG. 1 is a schematic cross-sectional view of an image forming apparatus 1 according to an embodiment of the present disclosure. The image forming apparatus 1 is a color printer employing a tandem system in which multiple image forming devices for forming toner images in different colors are aligned in a direction in which a transfer belt is stretched. The image forming apparatus 1 illustrated in FIG. 1 forms color and monochrome images on recording media by electrophotography. Alternatively, the image forming apparatus 1 may be a monochrome printer that forms monochrome images on recording media. Although FIG. 1 illustrates the image forming apparatus 1 as a color printer, the image forming apparatus 1 may be, e.g., a copier, a facsimile machine, or a multifunction peripheral (MFP) having at least two of printing, copying, scanning, facsimile, and plotter functions.

As illustrated in FIG. 1, the image forming apparatus 1 includes the multiple image forming devices arranged side by side in the center of the image forming apparatus 1. Each of the multiple image forming device includes one of photoconductors 20Y, 20M, 20C, and 20Bk as an image bearer. The multiple image forming devices form toner images of yellow (Y), cyan (C), magenta (M), and black (Bk) on the photoconductors 20Y, 20C, 20M, and 20Bk, respectively. In the following description, color-coded symbols Y, M, C, and Bk are omitted as appropriate because the configurations of the image forming devices are the same other than colors of toners of developers.

In each of the image forming devices, a photoconductor 20 is surrounded by a charger 30, a developing device 40, and a cleaner 50. Specifically, the photoconductor 20Y is surrounded by a charger 30Y, a developing device 40Y, and a cleaner 50Y The photoconductor 20C is surrounded by a charger 30C, a developing device 40C, and a cleaner 50C. The photoconductor 20M is surrounded by a charger 30M, a developing device 40M, and a cleaner 50M. The photoconductor 20Bk is surrounded by a charger 30Bk, a developing device 40Bk, and a cleaner 50Bk. The photoconductor 20 is rotatable clockwise in FIG. 1. The charger 30 is pressed against the face of the photoconductor 20. The charger 30 rotates in accordance with rotation of the photoconductor 20. A high voltage power supply applies a given bias voltage to the charger 30. Accordingly, the charger 30 uniformly charges the face of the photoconductor 20 rotating clockwise. The photoconductor 20, the charger 30, the developing device 40, and the cleaner 50 are attachable to and detachable from the image forming apparatus 1.

The image forming apparatus 1 further includes an exposure device 8 being parallel to the four photoconductors 20Y, 20C, 20M, and 20Bk and tilted downward. The exposure device 8 includes, e.g., a light source, a polygon mirror, an f-θ lens, and reflection mirrors.

The exposure device 8 exposes the charged surfaces of the photoconductors 20Y, 20C, 20M, and 20Bk with light according to image data of yellow, cyan, magenta, and black, respectively. Thus, the exposure device 8 forms an electrostatic latent image on each of the photoconductors 20Y, 20C, 20M, and 20Bk. The developing devices 40Y, 40C, 40M, and 40Bk supply toner of yellow, cyan, magenta, and black to the respective electrostatic latent images formed on the photoconductors 20Y, 20C, 20M, and 20Bk rotating clockwise in FIG. 1. Thus, the developing device 40Y, 40C, 40M, and 40Bk visualize the electrostatic latent images into toner images of yellow, cyan, magenta, and black, respectively.

In an upper portion of the image forming apparatus 1, removable toner bottles 9Y, 9C, 9M, and 9Bk are disposed. The toner bottles 9Y, 9C, 9M, and 9Bk are filled with fresh toner of yellow, cyan, magenta, and black, respectively. The fresh toner is supplied from the toner bottles 9Y, 9C, 9M, and 9Bk to the developing devices 40Y, 40C, 40M, and 40Bk through toner supply tubes interposed between the toner bottles 9Y, 9C, 9M, and 9Bk and the developing devices 40Y, 40C, 40M, and 40Bk, respectively.

The image forming apparatus 1 includes an endless intermediate transfer belt 11 as an intermediate transferor facing the photoconductors 20Y, 20C, 20M, and 20Bk. The photoconductors 20Y, 20C, 20M, and 20Bk contact an outer circumferential surface of the intermediate transfer belt 11. The intermediate transfer belt 11 is entrained around multiple support rollers such as support rollers 72 and 73.

In FIG. 1, the support roller 72 is coupled to a drive motor as a drive source. As the drive motor drives and rotates the support roller 72, the intermediate transfer belt 11 rotates counterclockwise in FIG. 1. The rotation of the intermediate transfer belt 11 rotates the support roller 73. In addition, the image forming apparatus 1 includes primary transfer rollers 12Y, 12C, 12M, and 12Bk inside a loop formed by the intermediate transfer belt 11. The primary transfer rollers 12Y, 12C, 12M, and 12Bk are disposed opposite the photoconductors 20Y, 20C, 20M, and 20Bk, respectively, via the intermediate transfer belt 11.

The image forming apparatus 1 includes high voltage power sources to apply primary transfer biases to the primary transfer rollers 12Y, 12C, 12M, and 12Bk to primarily transfer the toner images visualized by the developing devices 40Y, 40C, 40M, and 40Bk on the photoconductors 20Y, 20C, 20M, and 20Bk, respectively onto the intermediate transfer belt 11. After the primary transfer roller 12 primarily transfer the toner image from the photoconductor 20 to the intermediate transfer belt 11, residual toner that has failed to be transferred onto the intermediate transfer belt 11 remains. The cleaner 50 removes the residual toner from the photoconductor 20 to perform a next image formation.

The image forming apparatus 1 includes a secondary transfer roller 5 as a secondary transfer device disposed downstream from the primary transfer rollers 12Y, 12C, 12M, and 12Bk in a rotation direction of the intermediate transfer belt 11. The secondary transfer roller 5 contacts the intermediate transfer belt 11 on the support roller 72 to form a secondary transfer nip between the secondary transfer roller 5 and the intermediate transfer belt 11 on the support roller 72.

The image forming apparatus 1 includes a sheet feeder 61, a feeding roller 3, and a registration roller pair 4. The sheet feeder 61 accommodates sheets S as recording media. The image forming apparatus 1 further includes a fixing device 100 and an ejection roller pair 7 downstream from the secondary transfer roller 5 in a conveyance direction in which the sheet S is conveyed.

The following describes the image forming operation of the image forming apparatus 1.

First, the driver drives the photoconductor 20 to rotate the photoconductor 20 clockwise At this time, a discharger irradiates the surface of the photoconductor 20 with light to initialize a surface potential of the photoconductor 20.

Subsequently, the charger 30 uniformly charges the surface of the photoconductor 20 to a given polarity. The exposure device 8 emits laser beams onto the charged surface of the photoconductor 20 according to image data, thus forming an electrostatic latent image on the surface of the photoconductor 20.

The image data used to expose the photoconductor 20 is monochrome image data produced by decomposing a desired full color image into yellow, cyan, magenta, and black image data. As the electrostatic latent image formed on the photoconductor 20 passes through a developing area where the electrostatic latent image faces the developing device 40, the developing device 40 supplies toner as a developer to the electrostatic latent image formed on the photoconductor 20. Thus, the developing device 40 renders the electrostatic latent image visible as a toner image.

The intermediate transfer belt 11 rotates counterclockwise in FIG. 1. The primary transfer roller 12 is supplied with a primary transfer voltage having a polarity opposite a polarity of the charged toner of the toner image formed on the photoconductor 20.

As a result, a transfer electric field is formed between the intermediate transfer belt 11 and the photoconductor 20. The transfer electric field electrostatically and primarily transfers the toner image from the photoconductor 20 onto the intermediate transfer belt 11 rotating in synchronization with the photoconductor 20. Specifically, the toner images of yellow, cyan, magenta, and black formed on the respective photoconductors 20Y, 20C, 20M, and 20Bk are primarily transferred from the upstream photoconductor 20Y to the downstream photoconductor 20Bk in the rotation direction of the intermediate transfer belt 11 at different times so that the toner images of yellow, cyan, magenta, and black are superimposed one atop another on the intermediate transfer belt 11. As a consequence, a desired full color toner image is formed on the intermediate transfer belt 11.

Meanwhile, a conveyor such as the feeding roller 3 picks up and separates an uppermost sheet S from the sheets S stacked on the sheet feeder 61 to feed the uppermost sheet S to the registration roller pair 4. A leading edge of the uppermost sheet S strikes a nip between two rollers of the registration roller pair 4 before the registration roller pair 4 starts rotation to correct the skew of the sheet S.

The registration roller pair 4 starts rotating to send the sheet S to the secondary transfer nip between the support roller 72 and the secondary transfer roller 5 in accordance with the timing at which the full color toner image on the intermediate transfer belt 11 reaches the secondary transfer nip.

The image forming apparatus 1 in the present embodiment includes a high power source to apply a secondary transfer voltage having the opposite polarity to the toner charge polarity of the toner image on the face of the intermediate transfer belt 11 to the secondary transfer roller 5. Applying the secondary transfer voltage to the secondary transfer roller 5 collectively transfer the full color toner image formed on the face of the intermediate transfer belt 11 onto the sheet. Then, the sheet P bearing the full color toner image is conveyed to the fixing device 100. The fixing device 100 applies heat and pressure to the sheet S, thereby fixing the full color toner image onto the sheet S.

The sheet S bearing the fixed toner image is conveyed to the ejection roller pair 7. The ejection roller pair 7 ejects the sheet S onto an output portion, such as an output tray 17, of the image forming apparatus 1. Thus, the image forming operation completes. After the full color toner image is transferred onto the sheet S at the secondary transfer nip, an intermediate transfer belt cleaner 13 removes and collects residual toner, which has failed to be transferred onto the sheet S and therefore which is remaining on the intermediate transfer belt 11, from the intermediate transfer belt 11.

As described above, the image forming apparatus 1 forms the full color image on the sheet S. Alternatively, the image forming apparatus 1 may use one of the photoconductors 20Y, 20C, 20M, and 20Bk to form a monochrome image, or may use two or three of the photoconductors 20Y, 20C, 20M, and 20Bk to form a bicolor or tricolor image, respectively. Upon monochrome printing, an electrostatic latent image is formed on the photoconductor 20Bk and developed into a black toner image. The black toner image is transferred onto the intermediate transfer belt 11 and then transferred onto the sheet S. The fixing device 100 fixes the black toner image onto the sheet S. Thus, the image forming apparatus 1 forms a monochrome image on the sheet S.

A first fixing device according to the embodiment of the present disclosure is described below.

Figure 2:
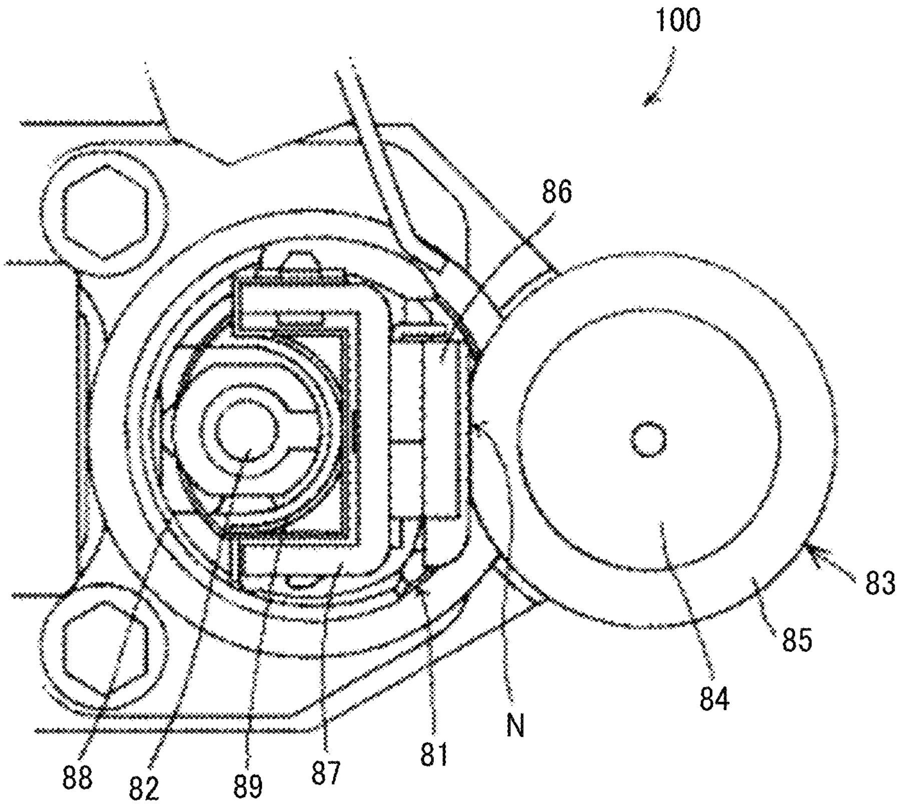
FIG. 2 is a cross-sectional view of a first fixing device according to an embodiment of the present disclosure.

FIG. 2 is a cross-sectional view of the first fixing device according to the embodiment of the present disclosure. The first fixing device 100 includes a rotatable endless fixing belt 81, a heat source 82 such as a halogen heater to heat the fixing belt 81, and a pressure roller 83 as a pressure rotator that is pressed against the outer circumferential face of the fixing belt 81.

In addition, the first fixing device 100 includes a nip formation pad 86 and a slide sheet on the nip formation pad 86. The inner face of the fixing belt 81 slides on the slide sheet. The inner face of the fixing belt 81 indirectly slides along the nip formation pad 86 via the slide sheet. The nip formation pad 86 faces the pressure roller 83 via the fixing belt 81 to form a fixing nip N.

In FIG. 2, the fixing nip N has a flat shape, but the fixing nip N may have a concave shape or other shapes.

The fixing nip N having the concave shape directs the leading edge of the recording medium toward the pressure roller 83 as the recording medium is ejected from the fixing nip N, facilitating separation of the recording medium from the fixing belt 81 and preventing jamming of the recording medium.

The fixing belt 81 may be an endless belt or film made of metal such as nickel or stainless steel (steel use stainless, that is, SUS), or resin such as polyimide. The surface layer of the fixing belt 81 has a release layer. The release layer is made of perfluoroalkoxy alkane (PFA) or polytetrafluoroethylene (PTFE) to facilitate separation of toner of the toner image on the sheet P from the fixing belt 81, thus preventing the toner of the toner image from adhering to the fixing belt 81.

Preferably, the fixing belt 81 includes an elastic layer made of silicone rubber interposed between a base layer and the release layer made of PFA or PTFE. The fixing belt not including the elastic layer made of silicone rubber has a smaller thermal capacity than the fixing belt including the elastic layer, which enhances the fixing performance.

However, when the fixing belt 81 presses the unfixed toner image on the sheet S, slight surface asperities in the fixing belt 81 are transferred onto the toner image on the sheet S, resulting in variation in gloss of the solid toner image that may appear as an orange peel image on the sheet S. To reduce the uneven gloss or the orange peel image, the elastic layer made of silicone rubber has a thickness of 100 μm or more. As the elastic layer deforms, the elastic layer absorbs the slight surface asperities, reducing the orange peel image.

The first fixing device 100 includes a stay 87 inside the loop of the fixing belt 81 to support the nip formation pad 86. The stay 87 prevents the nip formation pad 86 from being bent by the pressure of the pressure roller 83 to obtain a uniform nip width in the axial direction of the pressure roller 83.

The first fixing device 100 includes holders 88 (e.g., flanges) holding and fixing both ends of the stay 87 to position the stay 87. The first fixing device 100 further includes a reflector 89 between the heat source 82 and the stay 87. The reflector 89 reflects radiant heat from the heat source 82 toward the inner circumferential face of the fixing belt 81 and prevents the stay 87 from being heated unnecessarily by the heat source 82 and reducing waste of energy.

Instead of the reflector 89, the same effect can be obtained by the stay 87 having the surface that is heat-insulated or mirror-finished.

The heat source 82 may be a halogen heater as illustrated in FIG. 2, but may be an induction heating (IH), a resistive heat generator, a carbon heater.

The pressure roller 83 includes a core metal 84, an elastic rubber layer 85, and a release layer. The release layer serves as a surface layer that facilitates separation of the sheet from the pressure roller 83. The release layer is made of PFA or PTFE. A driver such as a motor situated inside the image forming apparatus 1 generates and transmits a driving force to the pressure roller 83 through a gear train, thus rotating the pressure roller 83.

A spring presses the pressure roller 83 against the nip formation pad 86 via the fixing belt 81. As the spring presses and deforms the elastic rubber layer 85 of the pressure roller 83, the pressure roller 83 produces the fixing nip N having the predetermined width. The pressure roller 83 may be a hollow roller and include a heat source such as the halogen heater inside the pressure roller 83.

The elastic rubber layer 85 of the pressure roller 83 may be made of solid rubber. Alternatively, if no heater is disposed inside the pressure roller 83, the elastic rubber layer may be made of sponge rubber. The sponge rubber enhances thermal insulation of the pressure roller 83, preferably causing the pressure roller 83 to draw less heat from the fixing belt 81.

As the driver drives and rotates the pressure roller 83, a driving force of the driver is transmitted from the pressure roller 83 to the fixing belt 81 through the fixing nip N, thus rotating the fixing belt 81 by friction between the pressure roller 83 and the fixing belt 81. The fixing belt 81 is sandwiched and rotated at the fixing nip N, and travels while being guided by holders 88 (flanges) at both ends in other portions than the fixing nip N.

With the construction described above, the first fixing device 100 attaining quick warm-up is manufactured at reduced costs.

A second fixing device 100*a* according to the embodiment of the present disclosure is described below.

Figure 3:
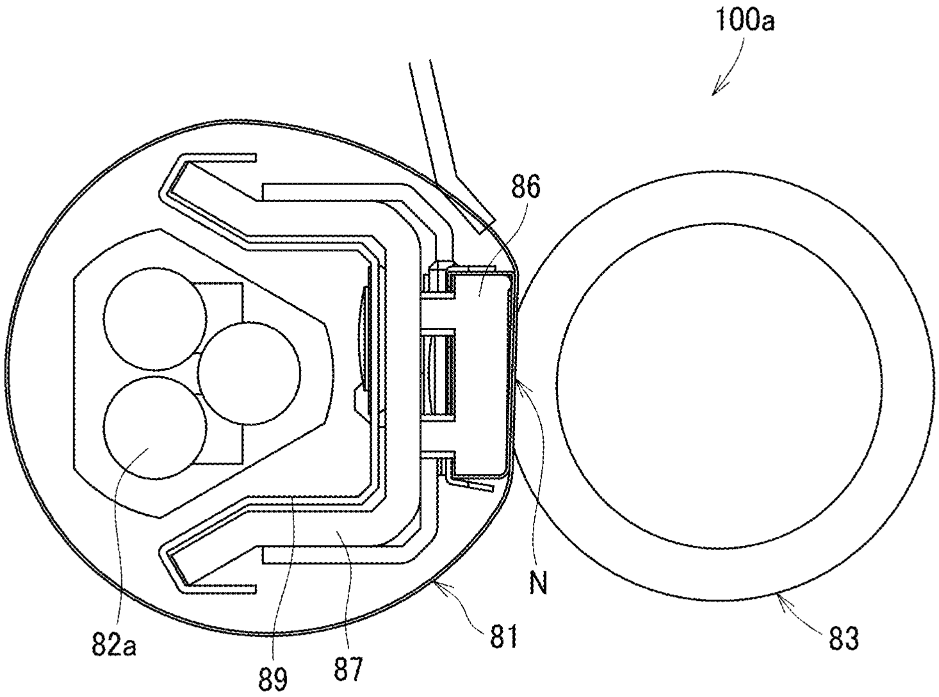
FIG. 3 is a cross-sectional view of a second fixing device according to an embodiment of the present disclosure.

FIG. 3 is a cross-sectional view of the second fixing device 100*a* according to the embodiment of the present disclosure. In FIG. 3, elements identical to those illustrated in FIG. 2 are given identical reference numerals, and the descriptions thereof are omitted.

The first fixing device 100 illustrated in FIG. 2 includes one halogen heater as the heat source 82. In contrast, the second fixing device 100*a* in the present embodiment includes three halogen heaters as a heat source 82*a* to suitably heat sheets having various widths. The three halogen heaters have different heat generation regions. Selecting the heater turned on according to the size of the recording medium enables heating a region corresponding the size of the recording medium on the fixing belt 81. As a result, the energy-saving performance and productivity are enhanced.

A third fixing device 100*b* according to the embodiment of the present disclosure is described below.

Figure 4:
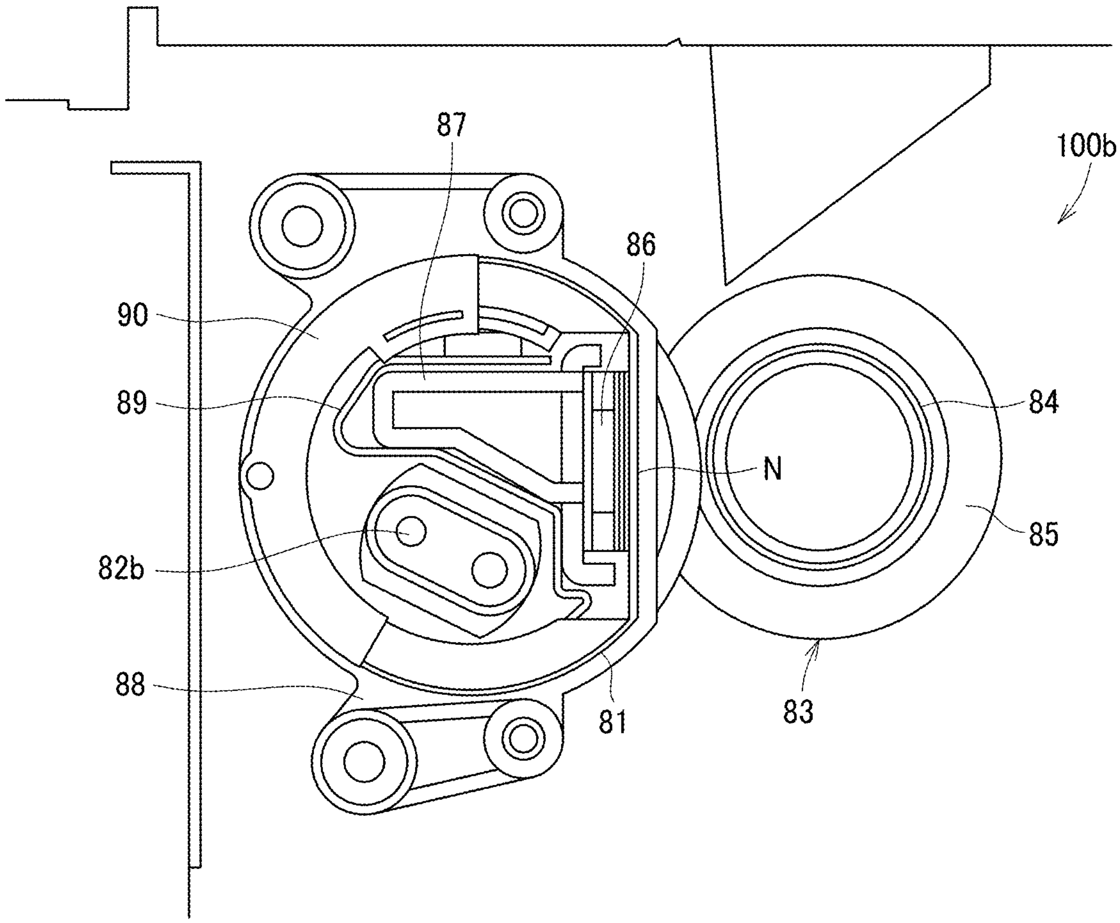
FIG. 4 is a cross-sectional view of a third fixing device according to an embodiment of the present disclosure.

FIG. 4 is a cross-sectional view of the third fixing device according to the embodiment of the present disclosure. In FIG. 4, elements identical to those illustrated in FIGS. 2 and 3 are given identical reference numerals, and the descriptions thereof are omitted.

Figure 5:
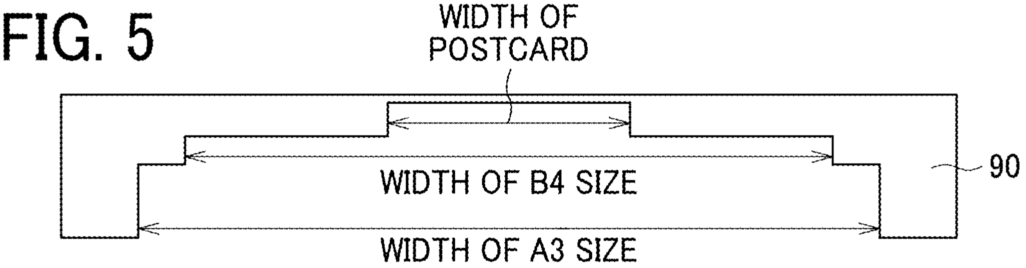
FIG. 5 is a developed view of a shield according to an embodiment of the present disclosure.

The fixing device 100*b* illustrated in FIG. 4 has a configuration in which a shield 90 is added to the configuration of FIG. 3. As illustrated in FIG. 5, the shield 90 has a stepped shape to form shield areas corresponding to widths of the recording media.

The shield is described below.

Figure 6B:
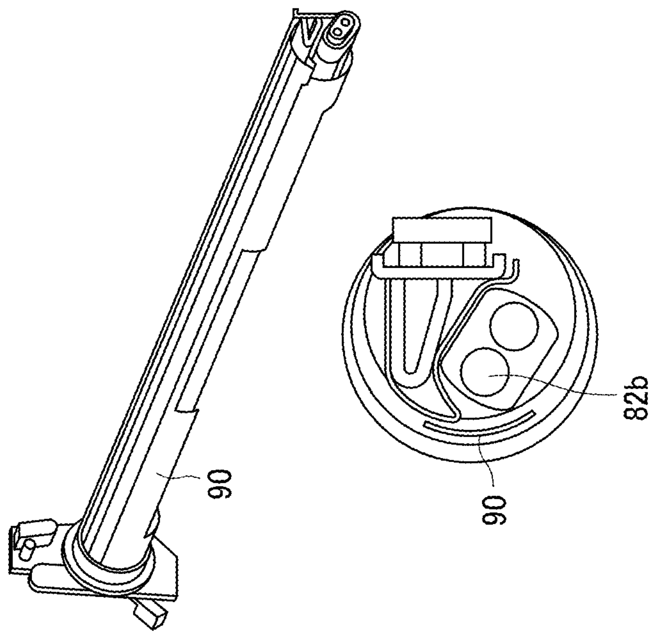
FIG. 6B is a perspective view (on an upper part) and a cross-sectional view (on a lower part) of a shield and parts around the shield to illustrate an example of arrangement of the shield when the recording medium having postcard size passes through the fixing device.
Figure 6A:
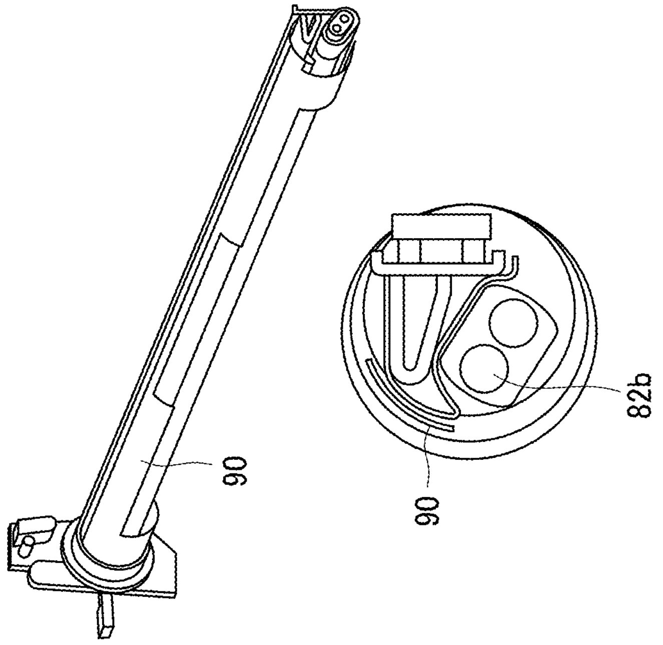
FIG. 6A is a perspective view (on an upper part) and a cross-sectional view (on a lower part) of a shield and parts around the shield to illustrate an example of arrangement of the shield when the recording medium having A3 size passes through the fixing device.

FIGS. 6A and 6B illustrate an example of arrangement of the shield. In each of FIGS. 6A and 6B, the upper part is a perspective view and the lower part is a cross-sectional view to illustrate the structure of the shield. FIG. 6A illustrates an example of arrangement of the shield when the recording medium having A3 size passes through the fixing device, and FIG. 6B illustrates an example of arrangement of the shield when the recording medium having postcard size passes through the fixing device. The shield 90 rotates to a position corresponding to each sheet width along the inner face of the fixing belt 81 not to be in contact with the fixing belt 81, and the shield 90 shields the radiant heat radiated to an area unnecessary for heating the sheet.

Since the shield 90 shields the radiant heat radiated to the area unnecessary for heating the sheet, an excessive temperature rise in a non-sheet passing region does not occur even when recording media each having a small width continuously pass through the fixing device. Lowering the productivity is not needed to reduce the excessive temperature rise.

The “non-sheet passing region” means a region through which a recording medium having the largest width of widths of sheets used in the fixing device does not pass. Providing the shield 90 enables reducing the number of halogen heaters as a heat source 82*b* in the present embodiment includes two halogen heaters.

The nip formation pad is described below.

Figure 7:
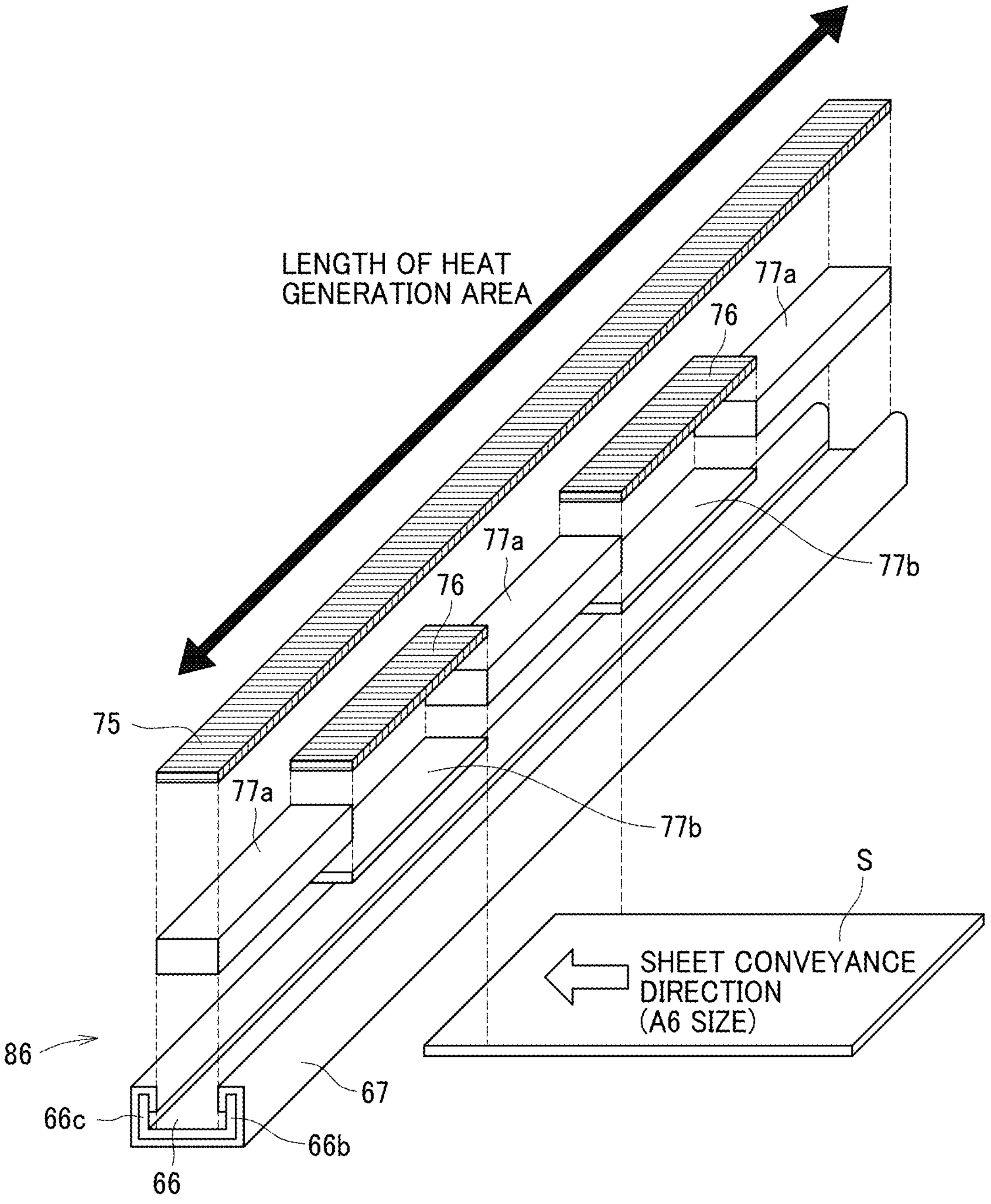
FIG. 7 is an exploded perspective view of a nip formation pad according to an embodiment of the present disclosure.

FIG. 7 is an exploded perspective view of the nip formation pad according to an embodiment of the present disclosure. This configuration aims to reduce the excessive temperature rise in the non-sheet passing region and has a function of reducing the number of heat sources (reducing the number of halogen heaters to two) and a function of substituting for the shield 90. With the nip formation pad 86 illustrated in FIG. 7, the shield 90 and a driver that drives the shield 90 are removable from the fixing device, allowing significant cost reduction.

As illustrated in FIG. 7, the nip formation pad 86 includes a thermal equalizer 66 serving as a primary heat transfer device. A slide sheet 67 is mounted on the thermal equalizer 66. The fixing belt 81 rotates and slides on the slide sheet 67. The slide sheet reduces the driving torque to drive the fixing belt 81 and the load caused by the frictional force due to the fixing belt 81.

The thermal equalizer 66 is made of a material having an increased thermal conductivity, for example, copper. The thermal equalizer 66 extends in the axial direction of the pressure roller 83 that is a longitudinal direction of the thermal equalizer 66. The thermal equalizer 66 absorbs excessive heat stored in the non-sheet passing region of the fixing belt 81 and conducts the absorbed heat in the longitudinal direction of the thermal equalizer 66.

Figure 8:
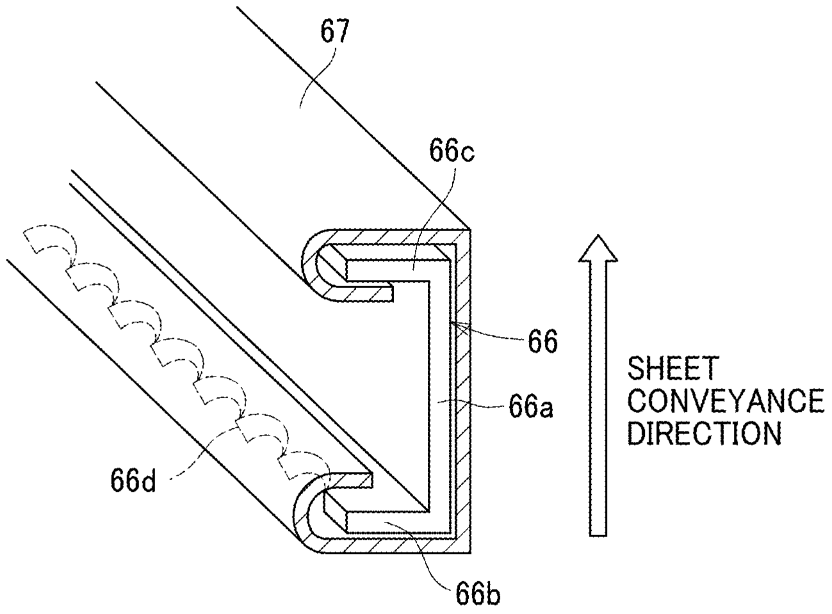
FIG. 8 is an enlarged perspective view of a part of the nip formation pad according to an embodiment of the present disclosure.

FIG. 8 is an enlarged perspective view of a part of the nip formation pad according to an embodiment of the present disclosure. As illustrated in FIG. 8, the thermal equalizer 66 has a contact portion 66*a* contacting the fixing belt 81 via the slide sheet 67, a bent portion 66*b* adjacent to the entrance of the fixing nip N in the conveyance direction of the sheet S, and a bent portion 66*c* adjacent to the exit of the fixing nip N. The bent portions 66*b* and 66*c* extend in a direction away from the inner face of the fixing belt 81.

The leading end of the bent portion 66*b* adjacent to the entrance of the fixing nip N has a holding portion 66*d* to hold the slide sheet 67 in a hooked manner. The holding portion 66*d* has multiple sharp protrusions. Even when the fixing belt 81 rotates and pulls the slide sheet 67 in a sliding direction in which the fixing belt 81 slides on the slide sheet 67, the holding portion 66*d* holds the slide sheet 67.

The multiple sharp protrusions of the holding portion 66*d* may not penetrate the slide sheet 67 as long as the fixing nip N can be appropriately formed. The sharp protrusion penetrating the slide sheet 67 gives a stronger force holding the slide sheet 67 against a force pulling the slide sheet 67, the force caused by rotating the fixing belt 81. If the fixing device has a structure rotating the fixing belt 81 in both forward and reverse directions, it is effective to provide a similar holding portion at the tip of the bent portion 66*c*.

Returning back to FIG. 7, the description is continued below. As illustrated in FIG. 7, the nip formation pad 86 includes first heat insulators 77*a*, second heat insulators 77*b*, first heat absorbers 76, and a second heat absorber 75.

The first heat insulator 77*a* is made of material having a lower thermal conductivity than the material of the thermal equalizer 66, such as resin. The first heat insulators 77*a* and the first heat absorbers 76 are arranged in the axial direction of the pressure roller that is a longitudinal direction of the fixing belt 81. The first heat insulators 77*a* are separated from each other. The first heat insulator 77*a* extends in the axial direction. The first heat insulator 77*a* is disposed between the thermal equalizer 66 and the second heat absorber 75. The first heat insulator 77*a* and the first heat absorber 76 do not overlap each other between the thermal equalizer 66 and the second heat absorber 75. The first heat insulator 77*a* prevents excessive heat absorption from the fixing belt 81.

As a result, a temperature drop in a sheet passing region can be prevented. In addition, a warm-up time can be shortened, and power consumption can be reduced.

The second heat insulator 77*b* is made of material having a lower thermal conductivity than the material of the thermal equalizer 66, such as resin. The second heat insulator 77*b* is disposed between the thermal equalizer 66 and the first heat absorber 76. The second heat insulator 77*b* reduces the amount of heat transfer from the thermal equalizer 66 to the second heat absorber 75 via the first heat absorber 76.

If the second heat insulator 77*b* is too thick, heat stored in the fixing belt 81 does not move to the second heat absorber 75, and thus temperature rise is likely to occur in the non-sheet passing region of the fixing belt 81. In accordance with the magnitude of the temperature rise occurring in the non-sheet passing region, the thickness and length of the second heat insulator 77*b* is optimized, but the thickness of the second heat insulator 77*b* is smaller than the thickness of the first heat insulator 77*a*.

The second heat absorber 75 is made of material having a higher thermal conductivity than the material of the first heat insulator 77*a* and the material of the second heat insulator 77*b*. The second heat absorber 75 extends in the longitudinal direction of the fixing belt 81 and is disposed to be in contact with the first heat insulators 77*a* and the first heat absorbers 76. The first heat absorber 76 is also made of material having a higher thermal conductivity than the material of the first heat insulator 77*a* and the material of the second heat insulator 77*b*. The first heat absorbers 76 are arranged in the axial direction of the pressure roller that is the longitudinal direction of the fixing belt 81. The first heat absorbers 76 are separated from each other. The first heat absorber 76 extends in the axial direction. The first heat absorber 76 is disposed between the second heat insulator 77*b* and the second heat absorber 75.

In particular, the first heat absorber 76 is at a position corresponding to a region other than the center region of the fixing belt 81 in which the excessive temperature rise in the non-sheet passing region of the fixing belt 81 is likely to occur. The first heat absorber 76 is disposed corresponding to the non-sheet passing region, but the present disclosure is not limited to this. The first heat absorber 76 may extend to a position corresponding to the sheet passing region in the longitudinal direction of the first heat absorber 76.

The thermal equalizer 66 has a function of facilitating heat transfer in the longitudinal direction of the thermal equalizer 66 to reduce a temperature difference in the fixing belt 81 and suppress the excessive temperature rise in the non-sheet passing region of the fixing belt 81. In contrast, the first heat absorber 76 and the second heat absorber 75 have a function of facilitating heat transfer in the thickness direction of the first heat absorber 76 and the second heat absorber 75 and absorbing heat. The first heat absorber 76 and the second heat absorber 75 compensate for the heat capacity shortage of the thermal equalizer 66. In particular, the second heat absorber 75 preferably has a large heat capacity and a large surface area to increase the amount of heat dissipation.

The ends of the slide sheet 67 in the slide direction are sandwiched by the heat absorbers, the heat insulators, and the bent portions 66*b* and 66*c* to more firmly fix the slide sheet 67. In addition, the above-described structure can prevent a temperature drop at the sheet passing region. Furthermore, the above-described structure can shorten the warm-up time and reduce the power consumption.

The following describes the slide sheet 67 having a characteristic configuration according to an embodiment of the present disclosure.

To enhance the durability of the fixing belt 81, the slide sheet 67 is typically made of a material having a low friction characteristic, and lubricant is typically applied to the slide sheet. A material having a low viscosity is used as the lubricant. Therefore, the lubricant has high fluidity and thus easily flows out from the fixing belt 81, which increases a sliding load (in other words, torque).

The lubricant applied to the slide sheet 67 tends to flow in one direction due to nip deviation in the longitudinal direction and the texture direction of the slide sheet 67. The nip deviation is a deviation of pressure caused by a static load deviation when the pressure roller presses the fixing belt and a dynamic load deviation when the pressure roller is driven by the one side driving method.

The shortage of the lubricant in a part of the slide sheet 67 in the longitudinal direction of the slide sheet 67 causes a variation in the linear velocity of the fixing belt 81 in the longitudinal direction (and a variation in friction between the fixing belt 81 and the slide sheet 67 in the longitudinal direction) and causes a conveyance failure such as an occurrence of wrinkles in the recording medium. In addition, the shortage of the lubricant in the part of the slide sheet 67 in the longitudinal direction increases the speed of the skew of the fixing belt 81. As a result, the load on the end of the fixing belt 81 increases, which shortens the life of the fixing belt 81.

To take countermeasures against the above disadvantages, the fixing device according to the embodiments of the present disclosure includes an adhesive part such as adhesive or a double-sided tape having an improved adhesive region on the face of the thermal equalizer 66, the face facing the fixing belt to attach the slide sheet 67 as illustrated in FIGS. 9A to 9D. Light black portions in FIGS. 9A to 9D indicate the adhesive regions of adhesive as an adhesive part or the double-sided tape as the adhesive part. The slide sheet 67 is made of a general product having textures formed by the warp t1 that is not particularly inclined in the conveyance direction and is not curved.

In the present embodiment, the double-sided tape has the adhesive region to bond the slide sheet 67 to the nip formation pad 86. The double-sided tape as the adhesive part includes a first adhesive part on the center part of the slide sheet 67 in the longitudinal direction of the slide sheet 67 orthogonal to the rotation direction of the fixing belt and the sheet conveyance direction. The longitudinal direction of the slide sheet 67 is also an axial direction of the fixing belt. In addition, the double-sided tape as the adhesive part includes a second adhesive part on each of both end parts of the slide sheet 67 in the longitudinal direction. The first adhesive part on the center part of the slide sheet 67 is closer to the entrance of the fixing nip than the second adhesive part on each of both end parts of the slide sheet 67. In other words, the second adhesive part on each of both end parts of the slide sheet 67 is closer to the exit of the fixing nip than the first adhesive part on the center part of the slide sheet 67. A method for bonding is not limited to the double-sided tape and may be any one of various methods.

Arrangements of the adhesion regions illustrated in FIGS. 9A to 9D are designed so that rotating the fixing belt 81 in a direction indicated by each arrow in each of FIGS. 9A to 9D generates a larger force holding the center part of the slide sheet 67 near the entrance of the fixing nip than a force holding the end of the slide sheet 67 near the entrance of the fixing nip in the longitudinal direction. The size of the adhesion region on the center part of the slide sheet 67 is designed to be larger than the size of the adhesive region on the end part of the slide sheet 67. In other words, the first adhesive part has a first area, and the second adhesive part has a second area smaller than the first area. As a result, the force holding the center part of the slide sheet 67 is larger than the force holding the end part of the slide sheet 67 in the longitudinal direction.

Since the force holding the center part of the slide sheet 67 in the longitudinal direction is large, rotating the fixing belt 81 bends the slide sheet 67 from a point on the center part of the slide sheet 67 near the entrance of the fixing nip. As a result, the textures formed by the warp t1 inclines as illustrated by dashed lines t2. The above-described inclination of the texture of the slide sheet 67 prevents the lubricant from flowing and leaking toward the ends of the slide sheet 67 in the longitudinal direction, which prevents the shortage of the lubricant and the increase in the sliding load due to the shortage of the lubricant.

Figure 9A:
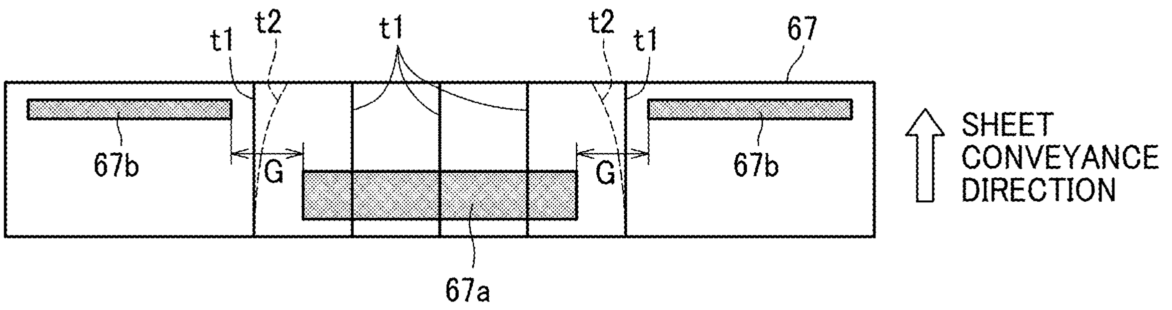
FIGS. 9A to 9D are diagrams illustrating adhesive regions according to a first to fourth embodiments of the present disclosure to bond a slide sheet to a nip formation pad.

A first embodiment is described below with reference to FIG. 9A. The fixing device according to the first embodiment includes the double-sided tape or the adhesive as the first adhesive part having a first adhesive region 67*a* on the center part of the slide sheet 67 in the longitudinal direction and another double-sided tape or another adhesive as the second adhesive part having second adhesive region 67*b* on each of both end parts of the slide sheet 67 in the longitudinal direction.

The longitudinal direction of the slide sheet 67 is along the axial direction of the fixing belt 81 and is orthogonal to the rotation direction of the fixing belt 81 and the sheet conveyance direction indicated by the arrow in each of FIGS. 9A to 9D.

The area of the first adhesive region 67*a* is larger than the area of the second adhesive region 67*b*. The first adhesive region 67*a* is closer to the upstream end of the slide sheet 67 in the rotation direction of the fixing belt that is the sheet conveyance direction than the second adhesive region 67*b*, and the second adhesive region 67*b* is closer to the downstream end of the slide sheet 67 in the rotation direction of the fixing belt than the first adhesive region 67*a*.

A gap G extending in the longitudinal direction of the slide sheet 67 is formed between the first adhesive region 67*a* and the second adhesive region 67*b*. White parts of the slide sheet 67 other than the light black parts in FIGS. 9A to 9D including the gaps G are non-adhesive regions in which the slide sheet 67 is not bonded to the thermal equalizer 66.

Figure 9B:
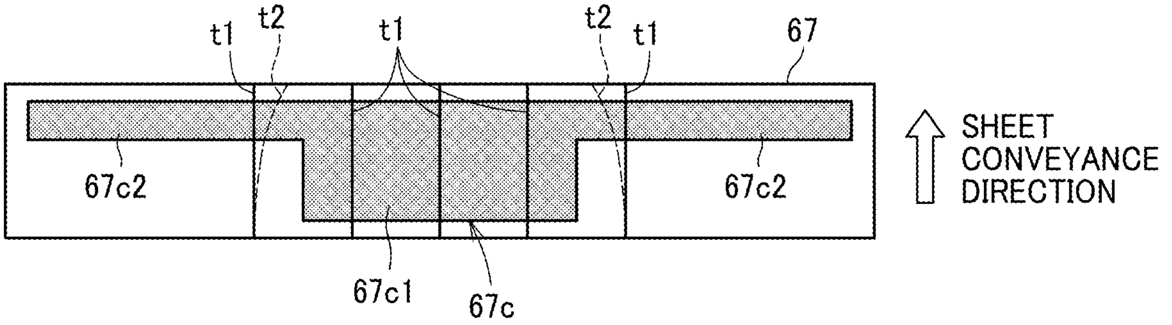

A second embodiment is described below with reference to FIG. 9B. The fixing device according to the second embodiment includes the double-sided tape or the adhesive as the adhesive part having one adhesive region 67*c*. The adhesive region 67*c* has a first adhesive region portion 67*c*1 on the center part of the slide sheet 67 in the longitudinal direction and a second adhesive region portions 67*c*2 on both ends of the slide sheet 67. In other words, the first adhesive part on the center part of the slide sheet 67 has the first adhesive region portion 67*c*1, and the second adhesive parts on both ends of the slide sheet 67 have second adhesive region portions 67*c*2. The first adhesive region portion 67*c*1 and the second adhesive region portions 67*c*2 are continuously connected in the longitudinal direction of the slide sheet 67.

The area of the first adhesive region portion 67*c*1 is larger than the area of the second adhesive region portion 67*c*2. The first adhesive region portion 67*c*1 is closer to the upstream end of the slide sheet 67 in the rotation direction of the fixing belt that is the sheet conveyance direction than the second adhesive region portion 67*c*2, and the second adhesive region portion 67*c*2 is closer to the downstream end of the slide sheet 67 in the rotation direction of the fixing belt than the first adhesive region portion 67*c*1.

Connecting the first adhesive region portion 67*c*1 and the second adhesive region portion 67*c*2 to form one adhesive region 67*c* reduces a difference between the force holding the center part of the slide sheet 67 and the force holding the end part of the slide sheet 67 in the longitudinal direction of the slide sheet 67. As a result, the inclination of the warp of the slide sheet 67 caused by the rotation of the fixing belt is reduced, which reduces the effect of preventing the lubricant from leaking.

However, the above-described structure has advantages that the number of components made of the double-sided tape can be reduced, which reduces a management cost and simplify the work to assemble the slide sheet on the nip formation pad. Since the sliding load while the fixing belt slides on the slide sheet is affected by multiple factors such as a linear velocity, a sliding range, and a temperature, it is desirable to optimize the shape of the adhesive region of the double-sided tape as appropriate in accordance with the configuration and conditions of the fixing device.

Figure 9C:
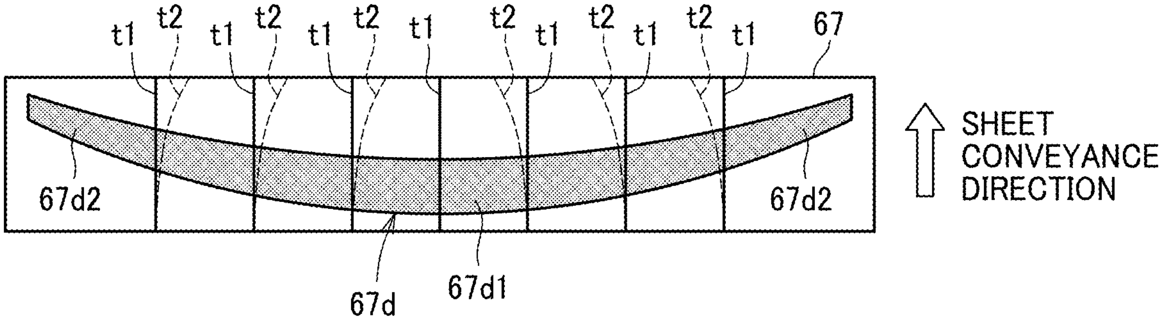

A third embodiment is described below with reference to FIG. 9C. The fixing device according to the third embodiment includes the double-sided tape or the adhesive as the adhesive part having an adhesive region 67*d* on the slide sheet 67. The adhesive region 67*d* has a first adhesive region portion 67*d*1 on the center part of the slide sheet 67 in the longitudinal direction and a second adhesive region portions 67*d*2 on both ends of the slide sheet 67. In other words, the first adhesive part on the center part of the slide sheet 67 has the first adhesive region portion 67*d*1, and the second adhesive parts on both ends of the slide sheet 67 have second adhesive region portions 67*d*2. The first adhesive region portion 67*d*1 and the second adhesive region portions 67*d*2 are continuously connected in the longitudinal direction to form an arc shape that is a convex shape projecting upstream in the rotation direction of the fixing belt.

The area of the first adhesive region portion 67*d*1 is larger than the area of the second adhesive region portion 67*d*2. The first adhesive region portion 67*d*1 is closer to the upstream end of the slide sheet 67 in the rotation direction of the fixing belt that is the sheet conveyance direction than the second adhesive region portion 67*d*2, and the second adhesive region portion 67*d*2 is closer to the downstream end of the slide sheet 67 in the rotation direction of the fixing belt than the first adhesive region portion 67*d*1. The adhesive region having the arc shape forming the convex shape projecting toward upstream in the rotation direction of the fixing belt increases the inclination of the warp of the slide sheet 67 caused by the rotation of the fixing belt to be larger than the inclination in the first embodiment and further enhances the effect of preventing the lubricant from leaking from the end of the slide sheet.

Figure 9D:
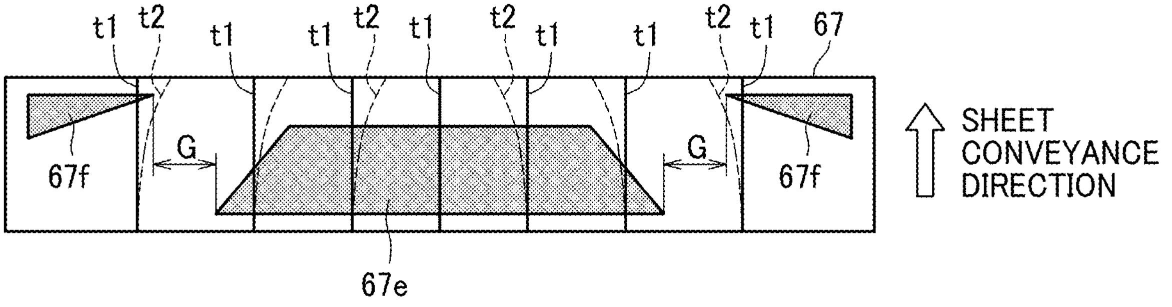

A fourth embodiment is described below with reference to FIG. 9D. The fixing device according to the fourth embodiment includes the double-sided tape or the adhesive as the first adhesive part having a first adhesive region 67*e* on the center part of the slide sheet 67 in the longitudinal direction and another double-sided tape or another adhesive as the second adhesive part having second adhesive region 67*f* on each of both end parts of the slide sheet 67 in the longitudinal direction.

The area of the first adhesive region 67*e* is larger than the area of the second adhesive region 67*f*. The first adhesive region 67*e* is closer to the upstream end of the slide sheet 67 in the rotation direction of the fixing belt that is the sheet conveyance direction than the second adhesive region 67*f*, and the second adhesive region 67*f* is closer to the downstream end of the slide sheet 67 in the rotation direction of the fixing belt than the first adhesive region 67*e*.

A gap G extending in the longitudinal direction of the slide sheet 67 is formed between the first adhesive region 67*e* and the second adhesive region 67*f*. The fixing device according to the fourth embodiment includes non-adhesive regions each including the gap G and having a tapered shape inclined toward the longitudinal center of a downstream side of the thermal equalizer 66 in the rotation direction of the fixing belt. The non-adhesive region having the above-described tapered shape increases the inclination of the warp of the slide sheet 67 caused by the rotation of the fixing belt to be larger than the inclination in the first embodiment and further enhances the effect of preventing the lubricant from leaking from the end of the slide sheet. In addition, since the non-adhesive region also functions as a guide path for the lubricant, the end leakage suppression effect can be further enhanced.

The adhesive regions illustrated by the light black portions in FIGS. 9*a* to 9D include a wide center portion and narrow both end portions in the longitudinal direction of the slide sheet 67. The above-described structure generates a strong adhesion of the center part of the slide sheet 67 to the thermal equalizer 66 and a weak adhesion of each of both end portions of the slide sheet 67 to the thermal equalizer 66. As a result, when a frictional force in the rotation direction of the fixing belt acts on the slide sheet 67, the downstream side of both end parts of the slide sheet 67 in the longitudinal direction is pulled toward the center of the slide sheet 67 in the longitudinal direction.

As a result, the original texture t1 of the slide sheet 67 indicated by the solid lines is inclined or curved toward the center in the longitudinal direction to form the texture t2 indicated by the dashed lines. The texture t2 formed by the warp inclined toward the center in the longitudinal direction forms flow paths that move the lubricant impregnated in the slide sheet 67 to the center of the contact portion 66*a* of the thermal equalizer 66 in the longitudinal direction, which enables preventing the lubricant from flowing out from the end of the thermal equalizer 66.

As a result, the above-described structure can reduce the sliding load (torque), extend the life of the driving system, and prevent the conveyance failure due to a linear velocity fluctuation (a fixing sleeve slip). In addition, the above-described structure can prevent the lubricant from transferring (contaminating) to other parts.

A control sample is described below with reference to FIG. 10. The fixing device in the control sample includes an engaging portion formed at the center portion of the slide sheet in the longitudinal direction of the slide sheet to fix the slide sheet to the upstream side of the nip formation pad in the rotation direction of the fixing belt, and both end parts of the slide sheet are not fixed to move freely. With this configuration, both end parts of the slide sheet in the longitudinal direction are pulled toward the center of the slide sheet in the longitudinal direction and toward downstream in the rotation direction of the fixing belt.

Figure 10:
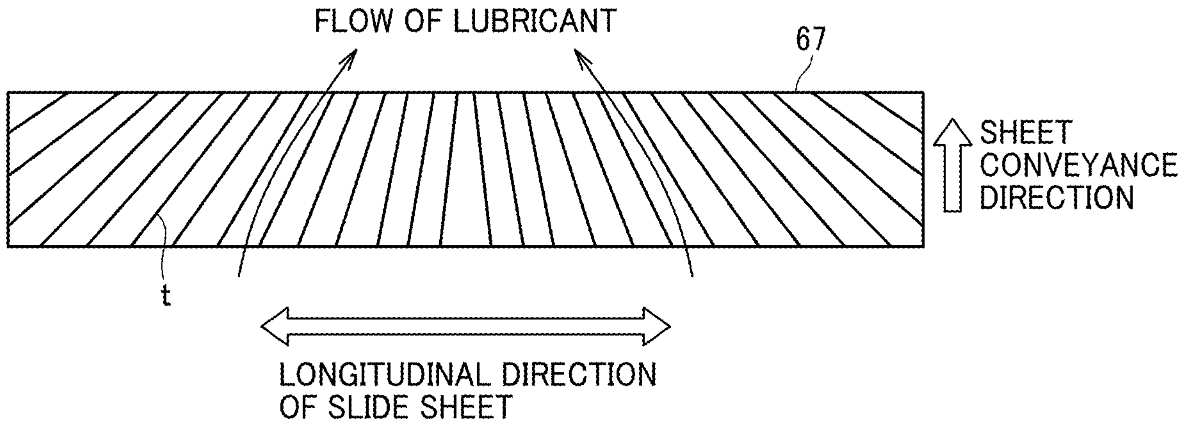
FIG. 10 is a schematic diagram illustrating flows of lubricant applied to a slide sheet in a fixing device according to a control sample.

As a result, the texture t of the warp of the slide sheet is inclined toward the center in the longitudinal direction as illustrated in FIG. 10, and the lubricant is also guided by the texture t to flow toward the center in the longitudinal direction. Accordingly, the above-described structure can prevent the lubricant from flowing out from both ends of the nip formation pad. However, in the above-described structure engaging the center part of the upstream side of the slide sheet in the longitudinal direction to the nip formation pad, an excessive force is likely to be applied to the engaging portion of the slide sheet, which may cause breakage of the slide sheet at the engaging portion.

In the embodiments of the present disclosure, the excessive force in the control sample in which the slide sheet is partially engaged to the nip formation pad does not occur. Accordingly, the breakage of the slide sheet in the control sample does not occur. Designing the adhesive regions on the slide sheet 67 as illustrated in FIGS. 9A to 9D enables obtaining the fixing device that can prevent the lubricant from leaking from the end of the slide sheet at low cost.

As described above, the fixing belt 81 rotates in accordance with the rotation of the pressure roller 83. The fixing device includes a drive gear or a drive motor on one side of the fixing device to rotate the pressure roller 83. In such a one-side drive system, the reaction force of the drive gear affects the end portion of the slide sheet on the non-drive side, and the lubricant is more likely to leak from the end portion of the slide sheet on the non-drive side. For this reason, it is preferable to reduce the size of the adhesive region on the non-drive side so that the inclination and curvature of the warp t2 on the non-drive side are larger than those on the drive side.

The embodiments of the present disclosure have been described in detail above. The above-described embodiments are examples and can be modified within the scope not departing from the gist of the present disclosure. Further, note that any fixing device and image forming apparatus may be employed as long as these configurations are applicable to this disclosure. The image forming apparatus is not limited to a copier or a printer. Alternatively, the image forming apparatus may be a facsimile machine or a multifunction device having two or more of copying, printing, and facsimile functions.

The following describes preferred aspects of the present disclosure.

First Aspect

In a first aspect, a fixing device includes a fixing rotator, a heat source, a pressure rotator, a nip formation pad, a slide sheet, and an adhesive part. The fixing rotator is rotatable in a rotation direction. The heat source heats the fixing rotator. The pressure rotator contacts an outer circumferential face of the fixing rotator. The nip formation pad forms a fixing nip between the fixing rotator and the pressure rotator. The slide sheet is between the fixing rotator and the nip formation pad to contact an inner circumferential face of the fixing rotator. The slide sheet has a center part and both end parts in an axial direction orthogonal to the rotation direction of the fixing rotator. The adhesive part bonds the slide sheet to the nip formation pad. The adhesive part includes a first adhesive part on the center part and a second adhesive part on one of the end parts. The first adhesive part has a first area, and the second adhesive part has a second area smaller than the first area of the first adhesive part.

Second Aspect

In a second aspect, the adhesive part in the fixing device according to the first aspect includes the first adhesive part having a first adhesive region and the second adhesive part having a second adhesive region. The first adhesive region has the first area, and the second adhesive region has the second area. The first adhesive region is separated from the second adhesive region.

Third Aspect

In a third aspect, the slide sheet in the fixing device according to the second aspect has a non-adhesive region between the first adhesive region and the second adhesive region.

Fourth Aspect

In a fourth aspect, the first adhesive region in the fixing device according to the second aspect or the third aspect is closer to an upstream end of the slide sheet in the rotation direction of the fixing rotator than the second adhesive region, and the second adhesive region is closer to a downstream end of the slide sheet in the rotation direction of the fixing rotator than the first adhesive region.

Fifth Aspect

In a fifth aspect, the adhesive part in the fixing device according to the first aspect includes the first adhesive part having a first adhesive region portion and the second adhesive part having a second adhesive region portion. The first adhesive region portion has the first area, and the second adhesive region portion has the second area. The first adhesive region portion is connected to the second adhesive region portion in the axial direction.

Sixth Aspect

In a sixth aspect, the first adhesive region portion in the fixing device according to the fifth aspect is closer to an upstream end of the slide sheet in the rotation direction of the fixing rotator than the second adhesive region portion, and the second adhesive region portion is closer to a downstream end of the slide sheet in the rotation direction of the fixing rotator than the first adhesive region portion.

Seventh Aspect

In a seventh aspect, the first adhesive region portion and the second adhesive region portion in the fixing device according to the fifth aspect or the sixth aspect form an arc projecting upstream in the rotation direction of the fixing rotator.

Eighth Aspect

In an eighth aspect, the non-adhesive region in the fixing device according to the third aspect extends from an upstream end to a downstream end of the slide sheet in the rotation direction of the fixing rotator, and the non-adhesive region is inclined toward a center of the nip formation pad in a longitudinal direction of the nip formation pad.

Ninth Aspect

In a ninth aspect, a texture of the slide sheet in the fixing device according to any one of the first to eighth aspects forms a flow path of lubricant, along which the lubricant impregnated in the slide sheet moves to the center part of the slide sheet.

Tenth Aspect

In a tenth aspect, an image forming apparatus includes the fixing device according to any one of the first to ninth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A fixing device comprising:

a fixing rotator rotatable in a rotation direction;

a heater to heat the fixing rotator;

a pressure rotator contacting an outer circumferential face of the fixing rotator;

a nip formation pad to form a fixing nip between the fixing rotator and the pressure rotator; and a slide sheet between the fixing rotator and the nip formation pad to contact an inner circumferential face of the fixing rotator, the slide sheet having:

a center part and both end parts in an axial direction orthogonal to the rotation direction of the fixing rotator; and an adhesive part to bond the slide sheet to the nip formation pad, the adhesive part including:

a first adhesive part on the center part; and a second adhesive part on one of the end parts, wherein:

the first adhesive part has a first area, the second adhesive part has a second area smaller than the first area of the first adhesive part, the first adhesive part has a first adhesive region portion having the first area, the second adhesive part has a second adhesive region portion having the second area, the first adhesive region portion is connected to the second adhesive region portion in the axial direction, the first adhesive region portion is closer to an upstream end of the slide sheet in the rotation direction of the fixing rotator than the second adhesive region portion, the second adhesive region portion is closer to a downstream end of the slide sheet in the rotation direction of the fixing rotator than the first adhesive region portion, and the first adhesive region portion and the second adhesive region portion form an arc projecting upstream in the rotation direction of the fixing rotator.

2. The fixing device according to claim 1, wherein;

the first adhesive part has a first adhesive region having the first area, the second adhesive part has a second adhesive region having the second area, and the first adhesive region is separated from the second adhesive region.

3. The fixing device according to claim 2, wherein;

the slide sheet has a non-adhesive region between the first adhesive region and the second adhesive region.

4. The fixing device according to claim 3, wherein:

the first adhesive region is closer to an upstream end of the slide sheet in the rotation direction of the fixing rotator than the second adhesive region, and the second adhesive region is closer to a downstream end of the slide sheet in the rotation direction of the fixing rotator than the first adhesive region.

5. The fixing device according to claim 1, wherein;

a texture of the slide sheet forms a flow path of lubricant, along which the lubricant impregnated in the slide sheet moves to the center part of the slide sheet.

6. The fixing device according to claim 5, wherein:

the texture is formed by a warp of the slide sheet that becomes inclined toward the center part in a longitudinal direction when the fixing rotator rotates.

7. An image forming apparatus comprising the fixing device according to claim 1.

8. The image forming apparatus according to claim 7, further comprising:

an intermediate transfer belt, wherein a toner image is transferred from the intermediate transfer belt to a recording medium, which is then conveyed to the fixing device.

9. The image forming apparatus according to claim 7, wherein:

the apparatus is a color printer comprising a plurality of image forming devices for yellow, cyan, magenta, and black toner.

10. The fixing device according to claim 1, wherein the fixing rotator is a fixing belt comprising a base layer, an elastic layer on the base layer, and a release layer on the elastic layer.

11. The fixing device according to claim 10, wherein:

the elastic layer includes silicone rubber and has a thickness of 100 micrometers or more.

12. The fixing device according to claim 1, further comprising:

a stay disposed inside a loop of the fixing rotator to support the nip formation pad against pressure from the pressure rotator.

13. The fixing device according to claim 12, further comprising:

a reflector between the heater and the stay to reflect radiant heat from the heater toward the fixing rotator.

14. The fixing device according to claim 1, wherein:

the pressure rotator comprises an elastic rubber layer made of sponge rubber.

15. The fixing device according to claim 1, wherein:

the heater comprises at least two halogen heaters having different heat generation regions.

16. The fixing device according to claim 1, wherein:

the nip formation pad comprises a thermal equalizer made of copper.

17. The fixing device according to claim 16, wherein:

the thermal equalizer comprises a holding portion having a plurality of sharp protrusions to hold the slide sheet.

18. The fixing device according to claim 1, wherein:

the adhesive part includes double-sided tape.

19. A fixing device, comprising:

a fixing rotator rotatable in a rotation direction;

a heater to heat the fixing rotator;

a pressure rotator contacting an outer circumferential face of the fixing rotator;

a nip formation pad to form a fixing nip between the fixing rotator and the pressure rotator; and a slide sheet between the fixing rotator and the nip formation pad to contact an inner circumferential face of the fixing rotator, the slide sheet having:

a center part and both end parts in an axial direction orthogonal to the rotation direction of the fixing rotator; and an adhesive part to bond the slide sheet to the nip formation pad, the adhesive part including:

a first adhesive part on the center part; and a second adhesive part on one of the end parts, wherein:

the first adhesive part has a first area, the second adhesive part has a second area smaller than the first area of the first adhesive part, the first adhesive part has a first adhesive region having the first area, the second adhesive part has a second adhesive region having the second area, the first adhesive region is separated from the second adhesive region, the slide sheet has a non-adhesive region between the first adhesive region and the second adhesive region, the non-adhesive region extends from an upstream end to a downstream end of the slide sheet in the rotation direction of the fixing rotator, and the non-adhesive region is inclined toward a center of the nip formation pad in a longitudinal direction of the nip formation pad.

20. The fixing device according to claim 19, wherein:

the first adhesive region and the second adhesive region have tapered shapes.

* * * * *